(12) United States Patent
Hughes et al.

(10) Patent No.: US 12,291,482 B1
(45) Date of Patent: May 6, 2025

(54) QUANTUM CELL MANUFACTURE USING MULTI-FINGER FLEXURE JIG

(71) Applicant: ColdQuanta, Inc., Boulder, CO (US)

(72) Inventors: Steven Michael Hughes, Louisville, CO (US); Seth Charles Caliga, Lafayette, CO (US)

(73) Assignee: ColdQuanta, Inc., Boulder, CO (US)

( * ) Notice: Subject to any disclaimer, the term of this patent is extended or adjusted under 35 U.S.C. 154(b) by 68 days.

(21) Appl. No.: 18/118,042

(22) Filed: Mar. 6, 2023

Related U.S. Application Data (60) Provisional application No. 63/333,506, filed on Apr. 21, 2022, provisional application No. 63/329,142, filed on Apr. 8, 2022.

(51) Int. Cl.
    C03C 27/06    (2006.01)
    B32B 37/00    (2006.01)
    B32B 37/10    (2006.01)

(52) U.S. Cl.
    CPC .......... *C03C 27/06* (2013.01); *B32B 37/0046* (2013.01); *B32B 37/10* (2013.01)

(58) Field of Classification Search
    CPC ...... C03C 27/06; B32B 37/0046; B32B 37/10
    USPC ................ 156/323, 358, 412, 413, 580, 581
    See application file for complete search history.

(56) References Cited

U.S. PATENT DOCUMENTS

| | | | |
|---|---|---|---|
| 2006/0022761 A1* | 2/2006 | Abeles | G04F 5/14 331/94.1 |
| 2023/0169385 A1 | 6/2023 | Meinert et al. | |

* cited by examiner

*Primary Examiner* — Philip C Tucker
*Assistant Examiner* — Jimmy R Smith, Jr.
(74) *Attorney, Agent, or Firm* — Young Basile Hanlon & MacFarlane, P.C.

(57) ABSTRACT

In the manufacture of a quantum cell, multi-finger jigs are used to hold precision masks flat during a photolithographic procedure and or to apply force uniformly over a bonding area during an anodic or other direct bonding procedure. The fingers of a jig are flexible that they can bend sufficiently independently of each other that one finger can accommodate a non-uniformity of a surface to be contacted by the jig so that other fingers remain in contact with other areas of the surface. The fingers can be defined by slits orthogonal to a perimeter of the jig.

20 Claims, 9 Drawing Sheets

QUANTUM CELL MANUFACTURE USING MULTI-FINGER FLEXURE JIG

CROSS REFERENCE TO OTHER APPLICATIONS

This application claims priority to U.S. Provisional Patent Application No. 63/329,142 entitled CONFORMAL APPLICATIONS OF FORCE IN FABRICATION OF QUANTUM ENABLING TECHNOLOGIES filed Apr. 8, 2022, and U.S. Provisional Patent Application No. 63/333,506 entitled MAGNETIC SHIELDING FOR ION PUMP filed Apr. 21, 2022, both of which are incorporated herein by reference for all purposes.

BACKGROUND OF THE INVENTION

As quantum technologies move from the lab to research and development to commercial applications (e.g., devices that fit into vehicles and phones) the demand for smaller quantum devices and, concomitantly, tighter manufacturing tolerances increases. For example, manufacturing tolerances are tightening for quantum cells that provide hermetically sealed environments for quantum particles (e.g., atoms and molecules for which quantum phenomena of superposition and/or entanglement are leveraged).

Herein, a "jig" is a device or system used to hold an object in place during manufacture. The jig is not usually part of the product being manufactured. A simple example of a jig is a weight used to hold an object flat or to press one object against another. In general, a jig should apply force uniformly across some area though, mechanically, only three points of contact is guaranteed. However, on the scale of miniaturized quantum devices, non-uniformities on a surface that contacts a jig can result in defects. What is needed is a jig that can be used to apply a uniform force to an object despite small non-uniformities in a contact surface of the object.

BRIEF DESCRIPTION OF THE DRAWINGS

Various embodiments of the invention are disclosed in the following detailed description and the accompanying drawings.

DETAILED DESCRIPTION

The present invention provides a multi-finger jig that provides force uniformly to an object surface despite small non-uniformities of the surface. Thus, a nonuniformity that rises above neighboring regions causes a respective finger of the jig to bend up while the other fingers remain in a more default level. As a result, the force applied by the jig is sufficiently uniform across the fingers and, depending on material thickness, sufficiently uniform between the fingers as well. This is in contrast with a solid jig as a single non-uniformity can cause the jig to fail to touch large areas of the object to be jigged.

Figure 1:
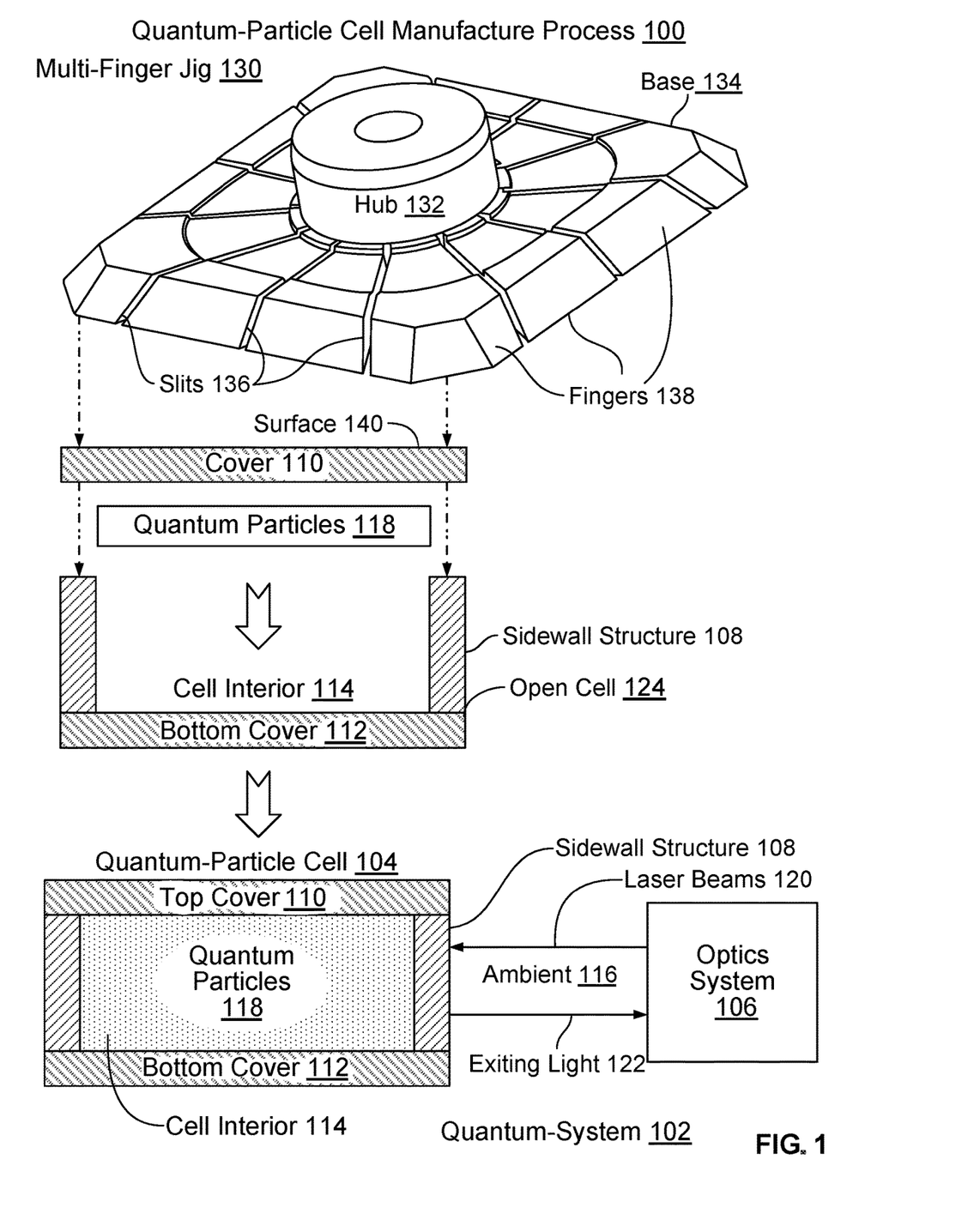
FIG. 1 is a diagram of a quantum-cell manufacture process that applies a multi-finger jig to promote bonding of a cover to a sidewall structure of a quantum cell.

A portion of a quantum-cell manufacture process 100 is diagrammed in FIG. 1. As shown near the bottom of FIG. 1, a quantum system 102 includes a quantum particle cell 104 and an optics system 106. Cell 104 includes a sidewall structure 108, a top cover 110, and a bottom cover 112; covers 110 and 112 are bonded to sidewall structure 108 so that a cell interior 114 is hermetically sealed from an ambient 116. Cell interior 114 contains quantum particles 118, e.g., rubidium or other alkali metal atoms. At least portions of sidewalls 108 or covers 110 and 112 are transparent so that light 120 (e.g., laser beams) from optics system 106 can enter cell 104 and so that light 122 can exit cell 104 to be detected by optics system 106. Alternatively, other forms of electro-magnetic radiation (e.g., radio frequency radiation) can be transmitted into and/or out of the cell.

An open cell 124 is shown in the middle of FIG. 1 shortly before completion of quantum cell 104. Bottom cover 112 is already bonded to sidewalls structure 108 and top cover 110 is ready to be bonded to sidewall structure 108 once quantum particles 118 are introduced to cell interior 114. A multi-finger jig 130, shown above top cover 110, is to be applied to top cover 110 as the latter is bonded to sidewall structure 108. Multi-finger jig 130 includes a hub 132 and a base 134. Slits 136 in the base define "multiple "fingers" 138 of multi-finger jig 130. The slits can be formed orthogonal to a perimeter of the jig, which, in this case, results in radial slits. Fingers 138 can adjust to non-uniformities in an upper (non-bonding) surface 140 of top cover 110 independently of each other, ensuring a relatively even distribution of force from hub 132 through the tips of fingers 138 that contact top cover 110.

Figure 2A:
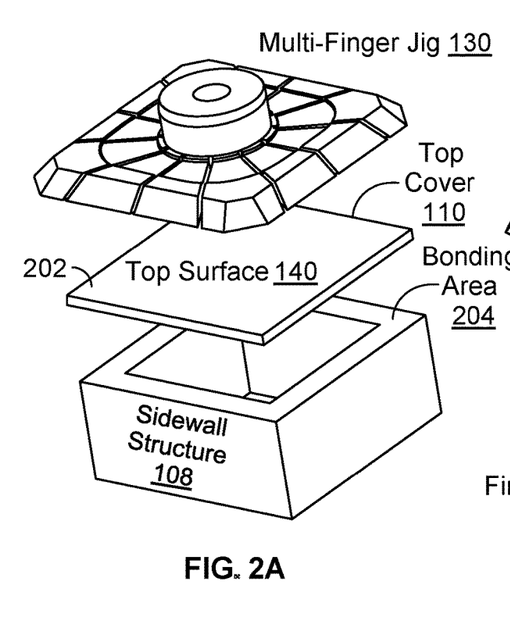
FIGS. 2A and 2B are top and bottom perspective views, respectively, of a sidewall structure, cover, and multi-finger jig of the quantum cell of FIG. 1.
Figure 2B:
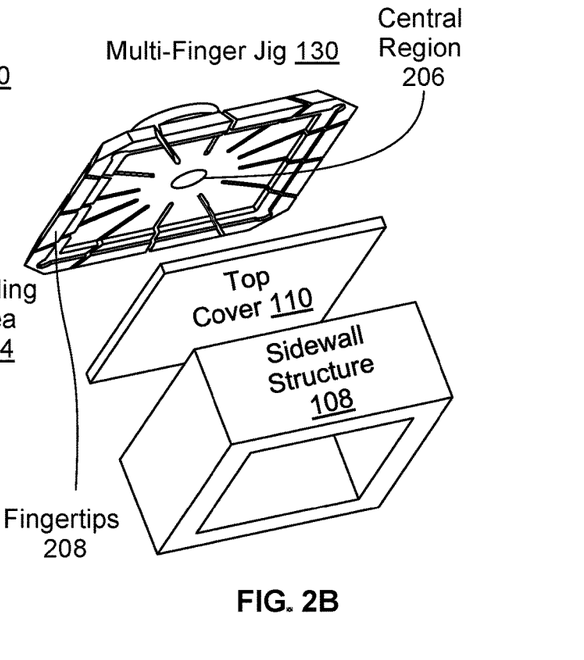
Figure 2C:
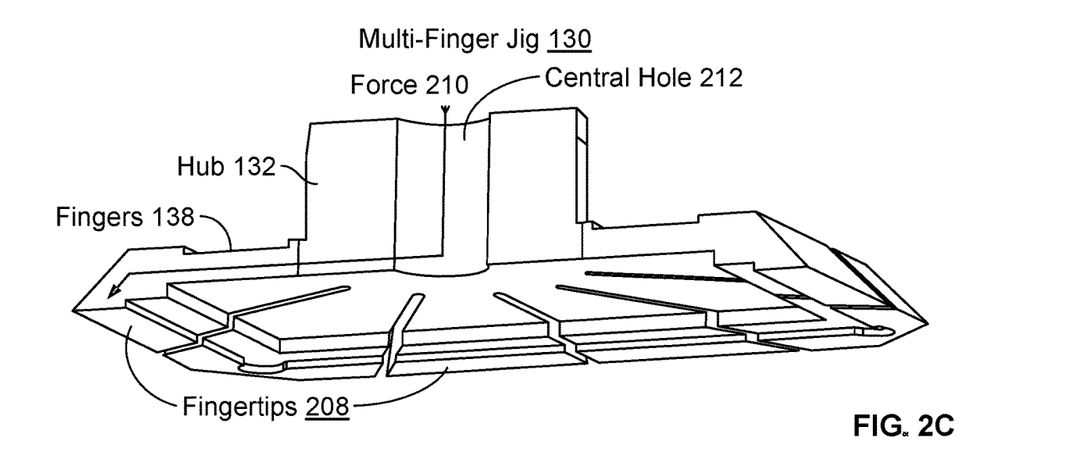
FIG. 2C is a perspective cutaway view of the multi-finger jig of FIG. 1.

As shown in FIGS. 2A-C, top cover 110 is to be bonded to quantum cell sidewall structure 108. Multi-finger jig 130 is to be used to apply force to cover 110 over peripheral regions 202 directly over the bonding area 204 of sidewall structure 108. Jig 130 has a tapered square or other rectangular cross section that matches the shape of bonding area 204, e.g., the top surface of sidewall structure 108. This cross section is divided by 12 radial slits 136 (FIG. 1) to yield 12 "fingers" 138, each of which can be moved up or down independently of the other fingers, as mentioned above with respect to FIG. 1. In other embodiments, the slits are non-radial, e.g., concentric, angled, or curved.

Thus, for example, a 100-micron particle or surface deformation on the top surface 140 of cover 108 can displace one finger while the remaining fingers are firmly pressed against respective portions of top surface 140. As best seen in FIG. 2B, a central region 206 of multi-finger jig 130 is raised relative to fingertips 208 (FIG. 2C). Fingertips 208 are beveled so that they are more flexible where they extend over bonding area 204. The beveling is also designed to allow better coverage by line-of-sight photolithographic processes.

Multi-finger jig 130 includes central hub 132. Downward force 210 applied to the hub 132 is distributed by fingers 138 to respective portions of the bonding area 204. The hub 132 can also be used as a handle for applying and removing multi-finger jig 130 from top cover 110, e.g., after the bond has fixed cover 110 onto sidewall structure 108. A central hole 212 in hub 132 can be used for optical access, and/or to receive a tool for manipulating jig 130. Jig 130 can be of glass or other transparent material to provide visual and other optical access to the bonding area. In other embodiments, other materials such as metal can be used.

Figure 3:
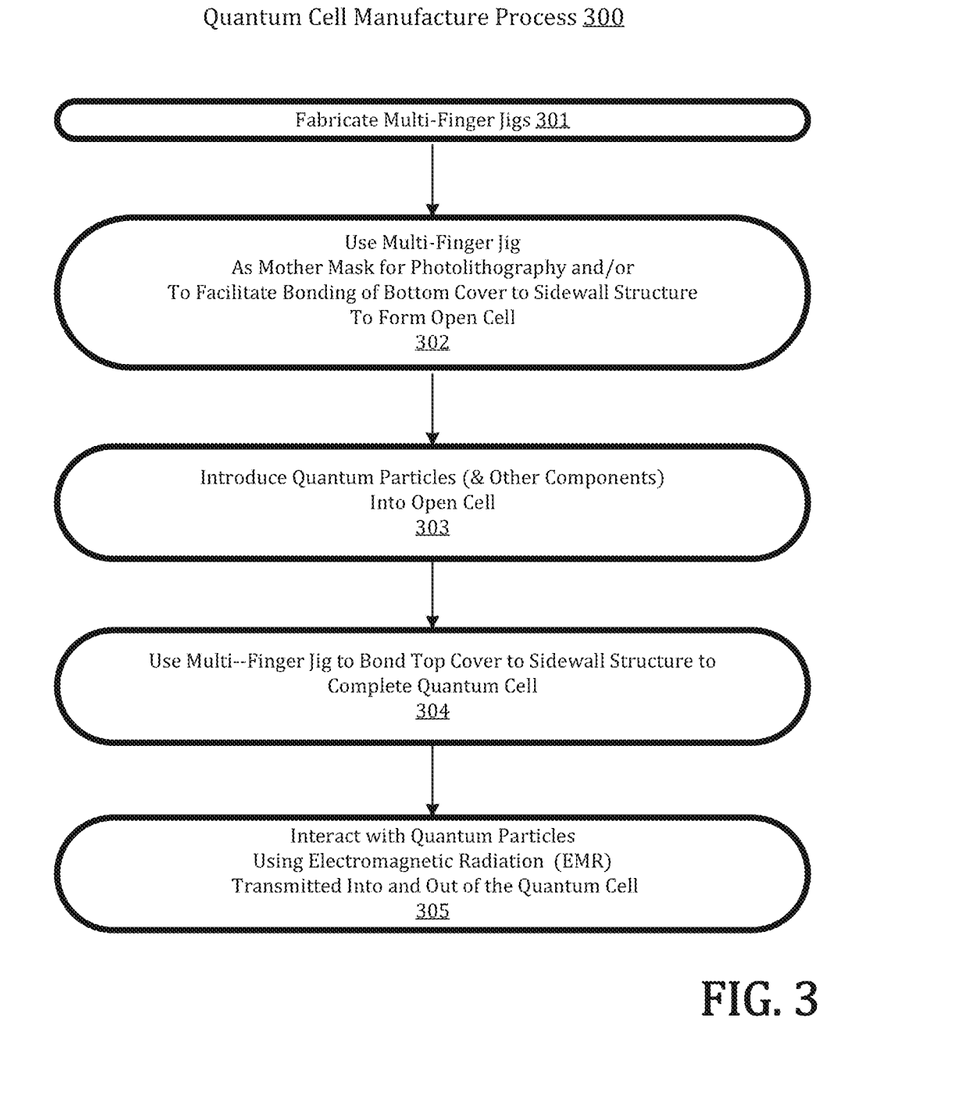
FIG. 3 is a flow chart of the quantum-cell manufacture process of FIG. 1.

A quantum cell manufacture process 300 begins at 301 with fabricating a multi-finger jig; the manufacturing includes making slits to divide a continuous base into multiple fingers. At 302, the multi-finger jig is applied in the manufacture of a quantum particle cell. In some embodiments, a multi-finger jig is used as a mother mask to hold a precision mask in place during a masking step of a photolithographic procedure. In some embodiments, a multi-finger jig is used to facilitate bonding, e.g., of a bottom cover to a sidewall structure. Depending on the embodiment, one action or both actions listed in 302 can be implemented. The same or a similar jig can be used to bond the bottom cover to the sidewall structure. At 303, quantum particles are introduced into the cell interior. At 304, the multi-finger jig is applied to assist the bonding, e.g., of a top cover to a sidewall structure to complete the cell. The jig can apply force to a window or component with sufficient uniformity about the perimeter to facilitate a rough-vacuum (capable of $10^{-1}$ torr or lower) seal between its polished and minimally compliant surfaces to prevent flexure-induced leakage limiting the achievable internal pressure. At 305, an optics system interacts with the quantum particles to control or interrogate their quantum states.

Figure 4A:
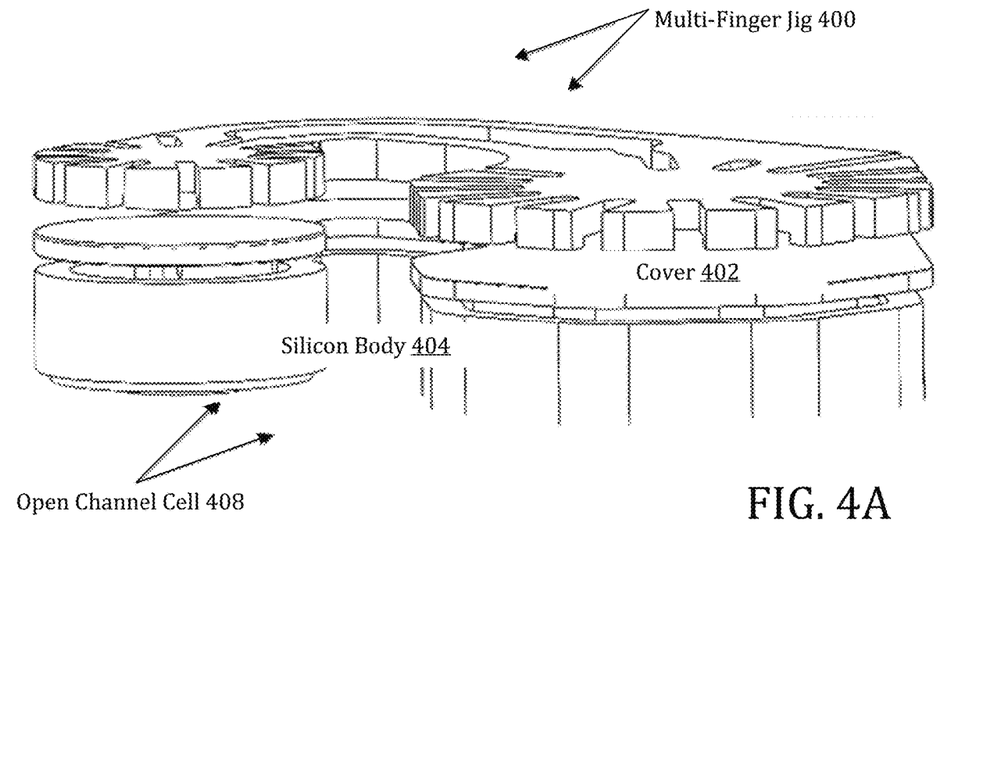
FIG. 4A is a side perspective exploded view of a sidewall structure of a quantum channel cell, a cover of the quantum channel cell, and a multi-finger jig applied as the cover is bonded to the sidewall structure.
Figure 4B:
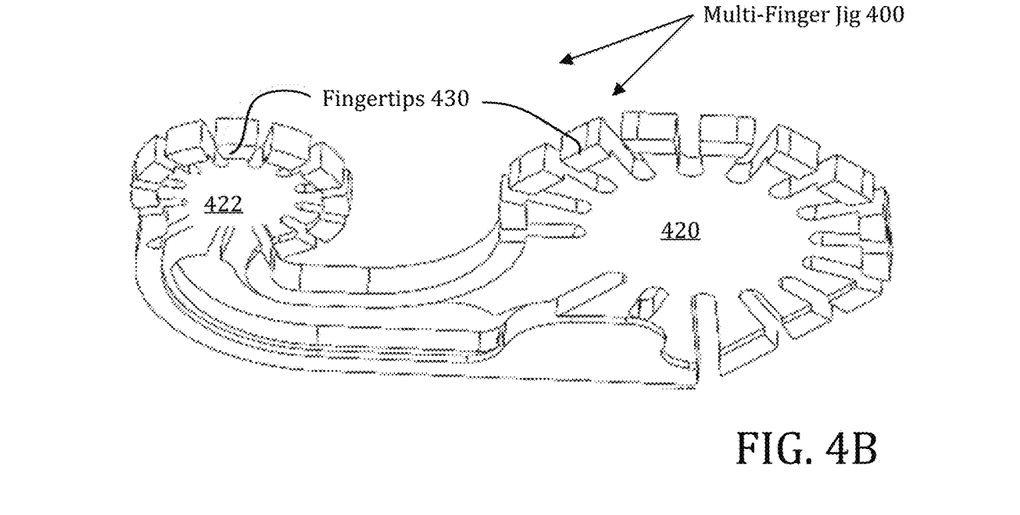
FIG. 4B is a bottom perspective view of the multi-finger jig of FIG. 4A.
Figure 5:
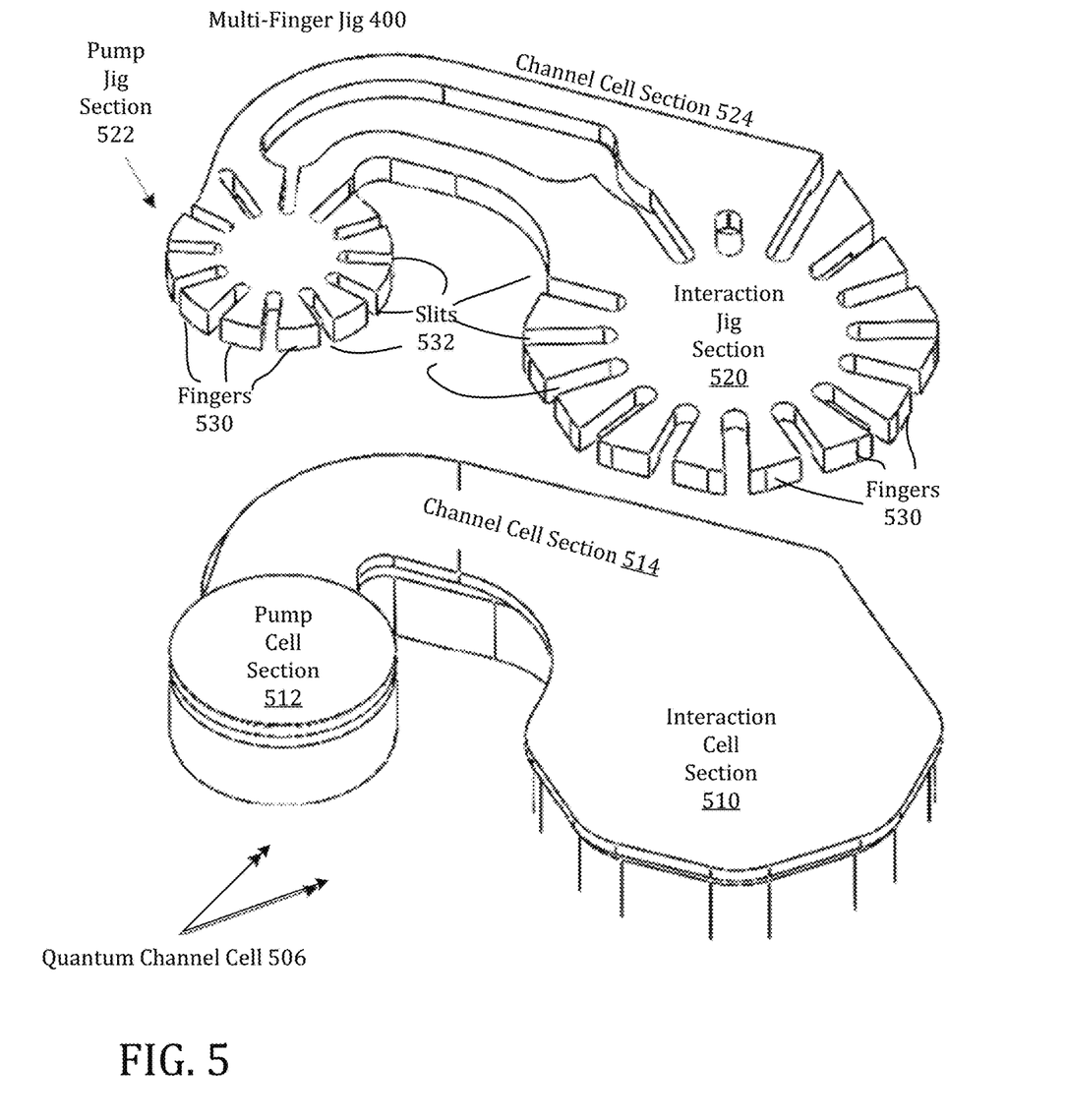
FIG. 5 is a top perspective view of the multi-finger jig of FIG. 4A being removed from the completed quantum channel cell resulting from the bonding of the cover of FIG. 4A to the sidewall structure of FIG. 4A.

A more complex jig 400 is shown in FIGS. 4A, 4B, and 5. As shown in FIG. 4A, jig 400 is used to apply force to a glass cover 402 as it is anodically or otherwise bonded to a silicon body 404 (i.e., sidewall structure) of an open cell 406 in the course of completing a quantum channel cell 506 (FIG. 5). Quantum channel cell 506 includes an interaction cell section 510, a pump cell section 512, and a channel cell section 514 coupling the ion pump section 512 to the interaction cell section 410. Accordingly, multi-finger jig 400 includes an interaction jig section 520, a pump jig section 522, and a channel jig section 524, so that multi-finger jig 400 matches the shape of cover 402 and the layout of body 404 (FIG. 4A).

Fingers 530 can be displaced by non-uniformities on the top surface of cover 402 so that a relatively uniform force can be applied over bonding regions despite the non-uniformities. In the case of multi-finger jig 400, the "fingers" are formed by making radial slits 532 in each of the interaction jig section 520 and the pump jig section 522. Note that the channel jig section 524 is split in two to help accommodate non-uniformities in the respective bonding area. In some embodiments, the slits are other than radial, e.g., concentric or spiraled. As best seen in FIG. 4B, center regions 420 and 422 of jig sections 520 and 522 are raised so that only fingertips 430 of multi-finger jig 400 contact cover 402 (FIG. 4A) during bonding.

Figure 6:
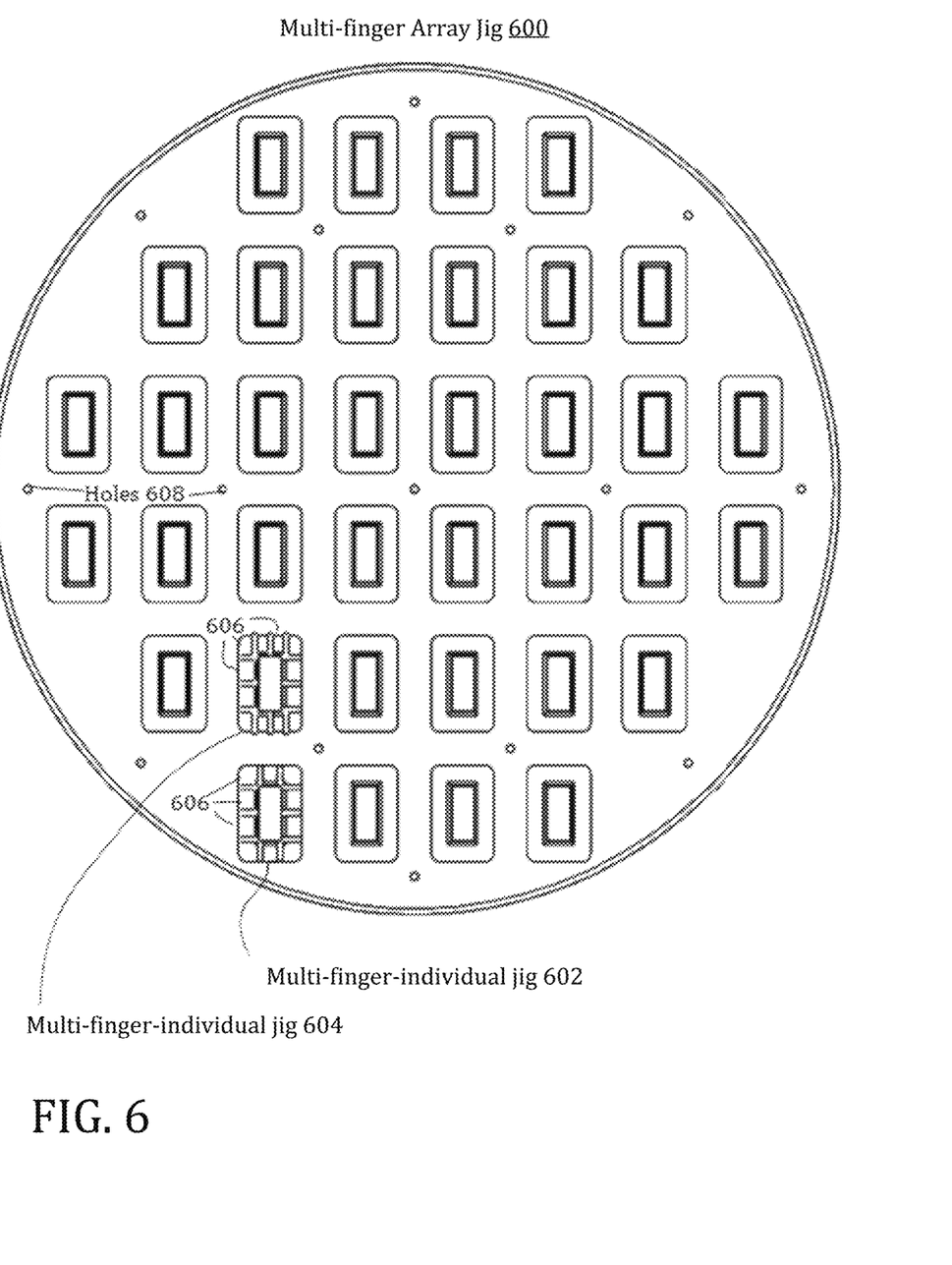
FIG. 6 is a bottom plan view of a multi-finger jig that is itself an array of multi-finger jigs.
Figure 7:
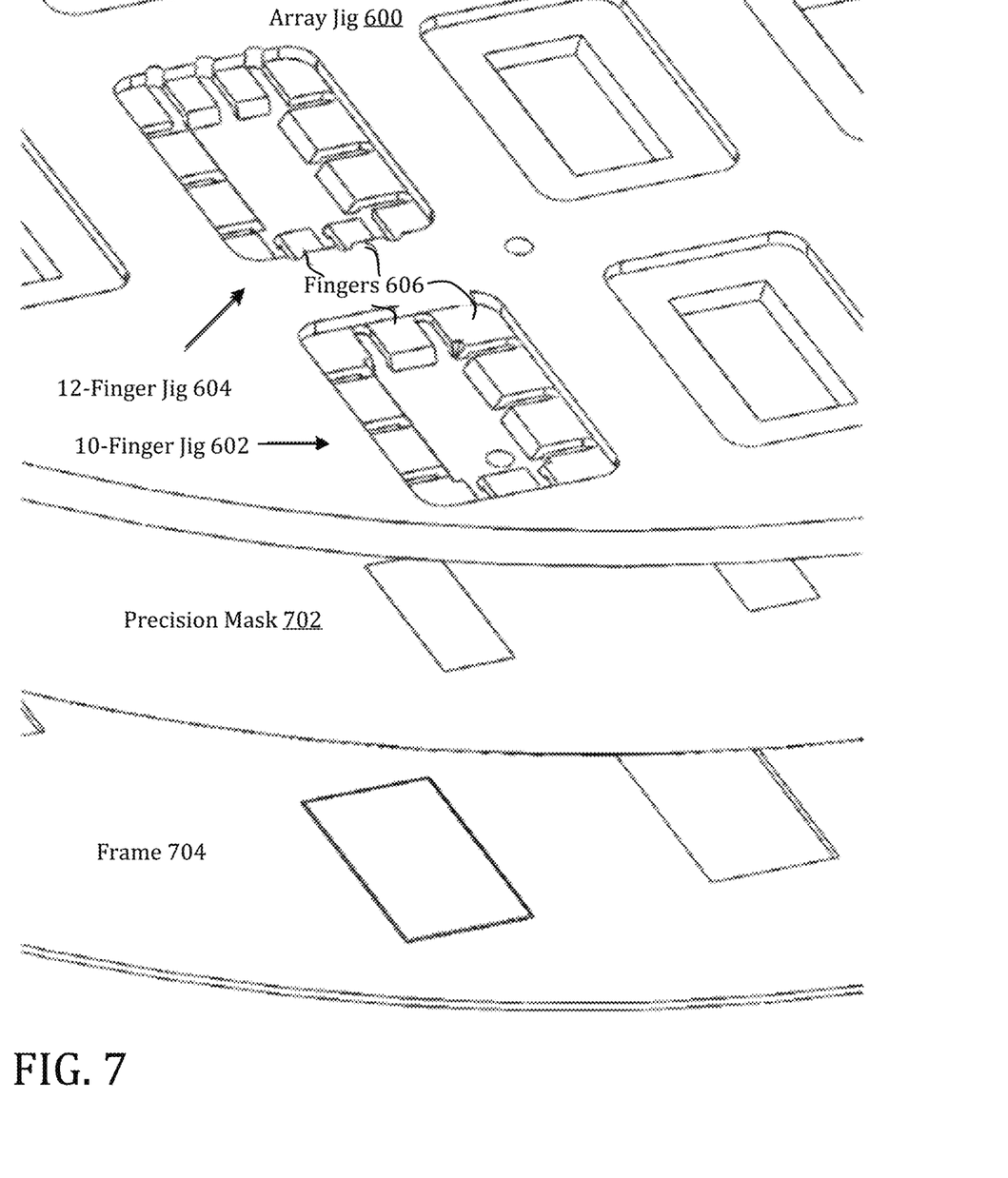
FIG. 7 is a perspective view of a portion of the multi-finger jig of FIG. 6 in a position above a precision mask to be held flat by the jig.
Figure 8:
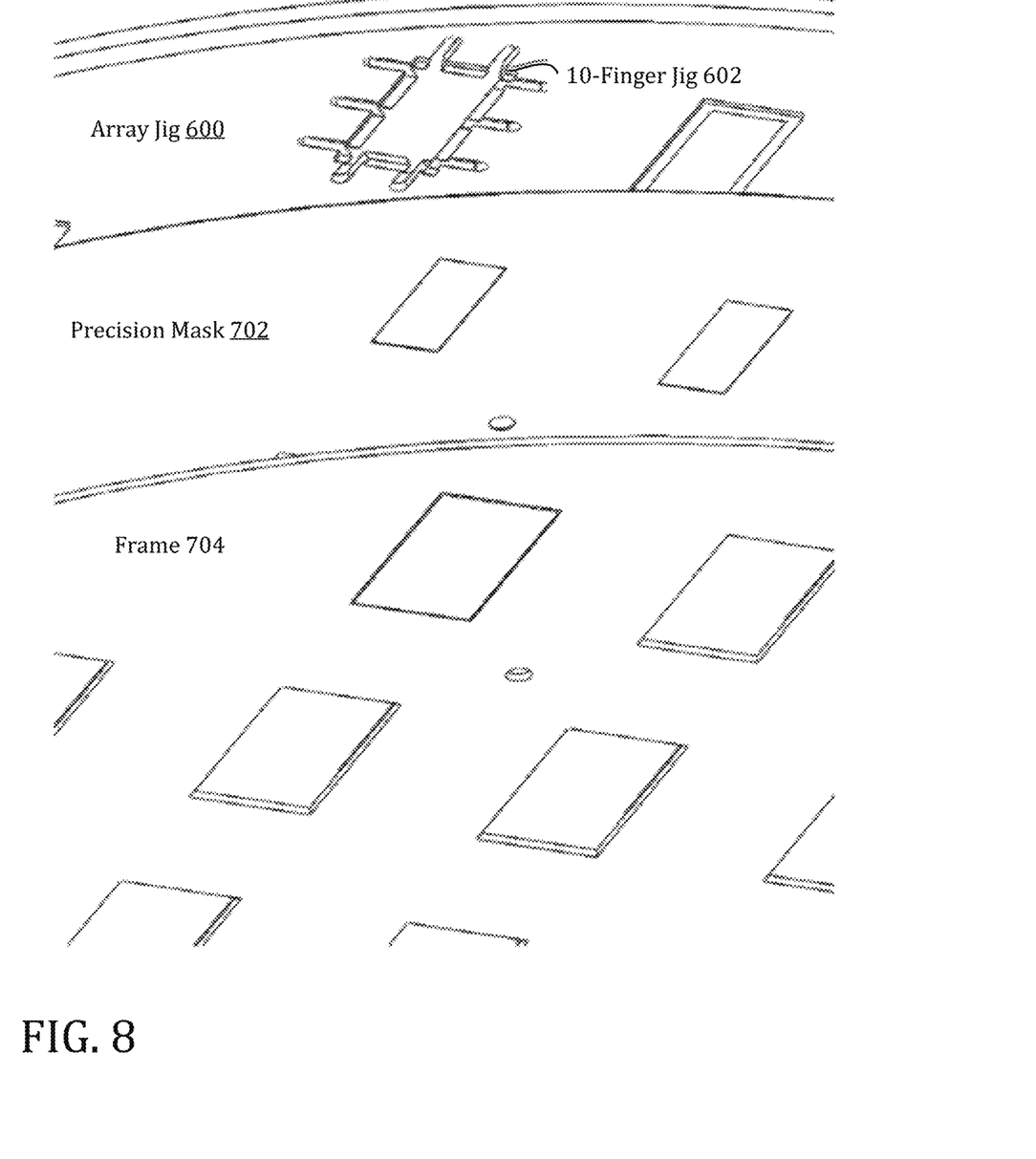
FIG. 8 is a top perspective view of the multi-finger jig of FIG. 6 above a precision mask and a frame for holding substrates to be processed through the precision mask.
Figure 9:
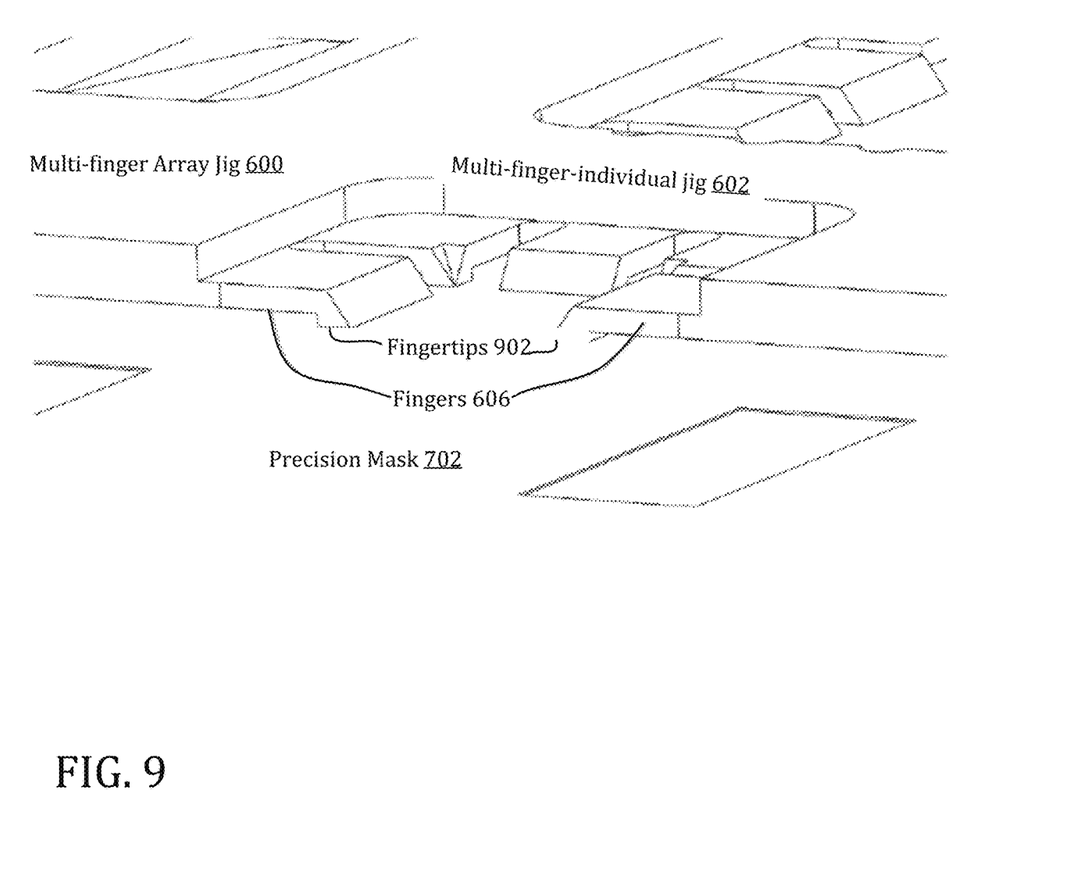
FIG. 9 is a bottom perspective view of the multi-finger jig of FIG. 6 above a precision mask and a frame for holding substrates to be processed through the precision mask.

A multi-finger array jig, 600 shown in FIG. 6, includes a monolithic array of 36 multi-finger individual jigs including jigs 602 and 604. Each of the individual jigs includes 10 or 12 fingers 606, as shown respectively for jig 602 and jig 604. Holes 608 in array jig 600 provide for precise alignment to a precision mask 702 and a frame 704, shown in FIGS. 7 and 8, for holding substrates that are the targets of a masked process (e.g., deposition, etch). In other words, array jig 600 serves as a mother mask to maintain the flatness of precision mask 702. As shown in FIG. 9 for jig 602, jig fingertips 902 are beveled. The beveling provides for better accommodation line-of-sight photolithographic processes. In another embodiment, a multi-finger jig can be applied to a mother mask (which may or may not be a multi-finger jig in its own right) while the mother mask ensures the desired conformity for a separate fine mask.

As quantum enabling technologies evolve and miniaturize to improve deployability and fabrication costs, there is a strong need to improve feature tolerances. For example, metal, semiconductor, or dielectric coatings such as conductive pads, antireflection coatings, etc., can cover nearly 100% of the available surface, and yet such coatings can interfere with assembly or bonding. An anti-reflection coating on the inside of glass or a conductive metal coating on the inside of metal or glass or silicon can be needed to cover the entire internal exposed surface but needs to end abruptly to enable an anodic bond, braze joint, etc. A metal coating can end with a gap before contact with the silicon to enable high voltage for anodic bonding through the glass, or metal contacts can be made on the uncoated or less-coated (masked) side where the electrode is left room to touch glass without conducting through the coating. A metal coating with such a gap can also be used to provide the electrode glass contact for anodic bonding. Dielectric coatings can also need a gap as some dielectrics, being oxides of natively conducting elements, can short to the silicon or due to current flow through the thin materials. Burns can be mitigated in vacuum or an inert environment.

Often such boundaries derive their precision from the method of application such as masked evaporation or sputtering, masked photoresist development and other similar removable or sacrificial boundaries imposed during application. Yet masks have various tradeoffs and as the scale of items decreases to enable devices that fit into vehicles, phones, etc., masking is often only achievable with direct writing and photolithography, where adhesive Kapton/polymer/metal masks or crude mechanical masks were sufficient. Even finely laser cut, microjet cut, or photoetched thin metal masks can have issues with conformity as pressing them firmly to a surface can scratch precision polished or surface finished parts. Such parts typically need to be rounded through tumbling, etching, polishing, etc., to reduce odds of scratching or localized high pressure points.

The present invention provides for improved conformal applications of force in fabrication of quantum enabling technologies. This improvement involves a change in paradigm for masking utilizing discrete components such as sheet metals or foils or even polished glass, crystal, or ceramic masks while still maximizing conformal mating of the mask at the edges to maintain tight pattern transfer tolerances through sputtering, evaporation, or other plating, etching, additive or subtractive operations.

One paradigm for metal masks involves a precisely machined and conformal metal negative to what is being plated in the example of sputter coatings. Sometimes a thinner mask can be used and patterned to get finer detail materials, but a mother mask is pressed over it to help hold the flimsy thin fine mask into position and into conformity. Applying pressure with the mother mask to flatten the thin mask is tricky as doing so is likely to make three points of contact or more; any imperfection in the fabrication of either mask can make one or more of those points more proud and thus contact first thereby applying a disproportionate amount of pressure and damaging the surface of the delicate or precision surface part being coated or hold up the fine mask allowing under-spray, edge blurring, or feathering of the coating.

The present invention calls for an alteration to the mother mask whereby the perimeter is tapered to allow for sputter/ line of sight from a range of angles in close proximity to the precision edges of the thin mask. The mother mask can have slits running roughly normal to the edges of the thin mask splitting what is often as few as three points of contact into many points of contact. If one point is more proud than the others, that segment will flex with less force applied allowing the other fingers to engage the mask and apply a more distributed load about the edges to force the thin mask into better conformity. This can be done with just a few or thousands of slits depending on geometry and can consist of multiple mother mask frames to more evenly distribute the load with a single point application of force, all of which can be independent, temporarily (i.e., with fasteners) combined, or permanently combined into one or more mother mask assemblies to accommodate geometries that are not easily achieved from a single part, be it through subtractive, additive or other methods of fabrication. In this way, one large complex part, one small fine part, or a large array of parts can have a single or a set or an assembly of flexure mother and fine masks allowing rapid installation of tooling, and more rapid turnaround in sequenced processes.

Subsets or subassemblies of masks can be swapped out between runs. For instance, different thin precision metal masks can be changed to accommodate different desired patterns; and different mother masks can be changed to accommodate different batch types.

Force can be applied at a single load point or multiple distributed points such as an array of screws, clamps, magnets, ties about a perimeter or strategically located between major or minor segments of the mask assemblies. Assemblies can be affixed directly to platens, (fixed or removable) or can be self-affixed to part assemblies allowing for rapid changeouts of coupons or assemblies in processing chambers. Assemblies can be made of materials compatible with various cleaning and surface treatment/preparation processes such as RCA cleaning, ultra/megasonic, plasma, ashing, vacuum firing, ion milling, wet etching, dry etching, etc. While the part being coated can protrude from the socket that holds it in place with respect to the mask, it can also be flush with or slightly recessed from the plate/plane. The choice in proud vs recessed is often driven by the relative expansion coefficients of components of the mask or part being fabricated to account for interference and increased pressure or increased gap growth and the need for the flexure (i.e., jig) to be able to flex further to compensate during processes especially thermal or heat generating or cooling processes.

Scratching of delicate surfaces such as polished or coated glass or silicon by the mask (which can be steel, brass, or other clean metals but also possibly glass or ceramic) can be mitigated with proper cleaning of all parts before assembly and polishing all of the components. Lapping and polishing interface of the mother-mask can help especially gently rounding all sharp edges created near and about contact points on the individual flexure fingers. This can be done manually, or with vibratory, lapping, polishing, tumbling, fluid based, gel, sand, bead blast, torch, etching, electropolishing and other such methods.

Thin masks can also be conformally coated with softer metals or materials to reduce scratching. After fabrication of the thin mask, or possibly before depending on whether conformity about the entire part or just the interfacing plane is desired, deposition of a soft copper, or even deposition or growth or electroplating of indium can form a very small malleable gasket that can be used to effectively seal temporarily to the surface in a conformal fashion with application of a distributed load from the mother mask flexure. Once applied, the tackiness of the thin mask can be sufficient that the mother mask can be removed prior to coating to maximize exposure and reduce risk of annealing the flexure structure in thermal processes, or damaging it in other coating, etching or deleterious processes.

Electrostatics or magnetics can be used to improve conformity using the intermediate sample being coated as a dielectric capacitor, or charge conductor depending. A ferrous material like steel or nickel can be used as the backside of the sample as a strong magnet or series of smaller focused magnets to pull the thin mask into conformity with the part being processed. The flexure can have magnets built in in one or multiple regions or can itself be magnetic or ferromagnetic to allow pulling of its multiple flexure fingers into conformity on the part.

Thinner flexure components can be bimetallic through coatings, explosion welding, or other means of forming creating a flexure in part or in whole that changes the amount of force applied based on temperature, humidity, electrostatics, atmospheric pressure or other environmental or directly applied stimuli. Thus, where requirements for mismatching or large coefficient of thermal expansion (CTE) materials are used as components, the flexure and mask can adapt to minimize damage or improve or maintain conformity.

Flexure structures actuated by heat or other means can further be used to reduce coating edge damage. For instance, by thermal cycling between coatings slight movement in the flexure can be encouraged to break bonds in the edge of the thin coating that may have formed between the sample and mask. While this sometimes roughs the edges up a bit, it can help reduce delaminations of thick coatings when the mask is finally removed. Small scale features in the mask to create shadowing masking at precise depths can also help to alleviate adhesion to the mask material at the edges.

A form of the flexure mask assembly can be used to help protect thin conformal sacrificial masks like photoresist. For instance, a photoresist mask can be applied for precise masking to micron scale or better. However, a process can be involved that is likely to push the limits of what the mask is capable of without stripping and reapplying. Therefore, a photoresist or conformal mask can be applied and then a slightly looser tolerance thin metal or similar mask can be aligned to protect most of the photoresist mask from a cleaning or other process that would damage the mask while leaving an opening for the exposed substrate surface to be coated, cleaned, etc. When done, the thin metal and flexure mask assemblies can be removed, and the surviving photoresist mask can be allowed to perform its intended function with minimal damage. For this one can wish to have the thin film mask overhang the photoresist mask slightly to expose only the edges to whatever deleterious intermediate process might damage the photoresist mask. This can be employed where it is impractical to apply photoresist masks multiple times or of sufficient thickness to withstand a cleaning, prep, etching or other intermediate process.

Such slitted/multi fingered flexure jigs can be used for distributed force application in bonding. Bonding can be direct, contact, anodic, etc. For example, in an anodic bond, a silicon piece and a glass piece are to be bonded over a perimeter of a couple to several hundred millimeters or more. As the parts get larger and more complicated like a channel cell or other of non-circular geometry, making two sufficiently large hot plates or jigs to press the parts into conformity becomes more challenging. Large arrays of vacuum cells or components thereof can be fitted to or machined from or comprise a larger platen or plate of silicon or other material.

Anodic bonding of pieces such as an array of vapor cells can be difficult if it needs individual endcaps either singulated, sprued, or still a single substrate with matching conformal patterns to the array of parts they will be bonded to. Making an array of vapor cells or similar discrete, quasi-discrete (not yet fully singulated) or to be singulated from bulk later, vacuum cells or other components can be tricky for anodic bonding; this is because any parts bonded in a single bonding session nominally fabricated to the same thickness/height may have flatness or conformity issues causing a subset of the array of parts to fail to bond when a single tool is used to bring parts into contact for bonding. A flexible baseplate and capturing structure or set of structures can hold one or multiple parts and apply force roughly evenly about all critical surfaces with a minimum of handling or time fitting the tool with parts for assembly. While parts to form multiple cells may have been designed to be the same thickness, variances of a micron can be sufficient to cause failures; flexible bonding structures alleviate the critical need for adjacent parts to be identical in height.

Further when heat, especially getting over 100° C., 200° C., 300° C., and even 400° C. is applied to a part, thermal expansion differences between components can cause warping, bowing and misalignment. This non-conformal change can cause bond failures especially if it is the supporting plate or fixturing that is warping. Therefore, building conformal flexures into the fixturing helps offset deformations that often occur due to the standard heating, vacuum, and bonding processes. Building, forming, or laminating bimetallic structures can also allow for thermal induced deformation compensating for less desirable but unavoidable deformations.

Conformal jigs also help to distribute heat along the part more uniformly as multiple points of contact can help heating compared to a single flat rigid heater plate. The increased surface area of flexures presents a problem for blackbody and increased convective cooling potential. Building structures to frustrate airflow or to isolate airflow helps to alleviate convection. Blackbody radiation can be mitigated with reflective structures surrounding to reflect the heat back in, and surface coatings such as gold or others can be used to engineer emissivity to minimize heat loss.

Alternatively, if the flexure is in vacuum where convection is not an issue, then multiple points of contact become more critical if the flexure is also used to help distribute heat conductively, and the flexure can be engineered to have very high emissivities to improve radiative cross-talk among and between all components and to help the flexure absorb radiation bouncing around the nicely polished/reflective UHV inner chamber walls. Thus, the flexure can help heat the part conductively and radiatively which, due to its vacuum isolation, can be natively difficult to heat otherwise.

Another method of forcing conformity is to draw vacuum. Initially applying mechanical pressure with tooling, pre-contact bonding wet or dry, or just setting the parts together can precede the application of vacuum. Vacuum for applications such as anodic bonding (T>150° C., V>100 volts) can avoid a peak in the Paschen curve for plasma formation. Thus, pressures can range from $10^3$ to $10^{-13}$ torr, with pressures below 1 torr typically being desired. For this, there are few methods of forming a vacuum seal that are compatible with high temperature. One is use of compressible higher temperature materials like graphite; another is to make the parts pre-polished to be extremely conformal/flat approaching or even exceeding 1λ per inch.

Some flex in the part and bonding plate can help compensate for imperfect conformity but, in ambient atmospheric conditions, the forces applied as parts get over 1 square inch means tens to hundreds of pounds force will be applied and often results in damage/scratches/chips/pitting of polished surfaces with the smallest imperfection or contaminant. Utilizing of compressible graphite or similar gasket material can help alleviate damage from dust/contaminants or the heater plate itself, while also improving thermal conduction to the parts being bonded. Done properly an entire anodic bonded assembly can be brought into mechanical contact then vacuum pulled to apply force, then bonded by whatever means is expedient/appropriate in a single bonding session even if the assembly contains anywhere from 1 to 100 bonds. Electrodes can be applied individually or through AC (alternating current) fields to a single or stack of bonds.

Indeed, the thermally conductive gasket can help the vacuum seal by regions in that regions that are able to make contact to the cell will be cooler than those which are not quite in thermal contact, allowing them to expand a bit further if conformity is already close. Compressible graphite and other high temp compressible materials can further act as a sponge of sorts for materials like indium. If temperatures are not too high above melting, they can act as a dam, a guide, or even an intercalable sponge utilizing the molten metal to help make a seal in a controlled manner.

One such application requiring conformal applications of force on cell assembly is when the components of the cell actively resist being laying or being compressed into conformity despite both naturally having flatnesses that would otherwise accommodate a union. This can be because the assembly includes in-vacuum optical frames, mounts or subassemblies that must be spring loaded and referenced against hard surfaces to minimize risk of shock-vibe. In such applications the frames are typically precision machined and located against 2-3 surfaces with at least four total points of contact. While at least one of the non-contacting opposing plates is spring loaded against the inside of the vacuum cell. Alternatively, a magnetic field shim or shield flux coupler/internal yoke bridge, can be installed in the gap of an external magnetic shield to help conduct flux and reduce stray field through the vacuum chamber. Such an insert likewise is likely referenced against at least one plane and spring loaded against at least one opposing plane to locate it and reduce shock-vibe coupling or damage. In such cases, as a cell having such inserts, it becomes more critical that a means of compressing the internal component springs is found that still enables uniform applications of force about the perimeter to ensure a successful bond forming the vacuum chamber.

Ion pump magnetic shielding is used to shield the ion pump's magnetic field from the cold atom traps. The design consists of multiple layers of shielding and results in more than a factor of 100 decrease in the magnetic field seen by the atoms. The innovation achieves target specifications in terms of Size, Weight, and Power (SWaP), total atom number, atom load rate, and trap lifetime.

The Cold Atom Source System (CASS) is an integrated cold atom module that uses miniaturized and embedded hardware instruments. The key subsystems include a vacuum cell, laser system, opto-mechanics, magnetics, and control electronics. The purpose of the device is to serve as a cold atom source platform for the deployment of quantum Position, Navigation, and Timing (QPNT), quantum computing, and quantum memory systems. The key characteristic for a deployable quantum system is that it is compact, power efficient, and ruggedized for harsh environments. The performance of CASS is benchmarked against critical performance metrics including SWAP, atomic flux, total atom number, sample temperature, and trap lifetime.

Quantum technology based on ultracold atom sensors and computers has the ability to outperform current state-of-the-art technologies. In order to realize this quantum advantage, major improvements are made to the core cold atom hardware such that these systems are easily deployable, given increased manufacturing readiness level (MRL) and technology readiness level (TRL) through the design of CASS.

"Channel cell" technology provides s a compact, monolithic vacuum cell. This work has been patented under U.S. Pat. No. 8,415,612B2 and serves as the basis for the vacuum cell technology used within CASS. System integration is achieved in the form of "turn-key" scientific instrumentation for researchers in ultracold atom physics. The hardware includes lasers, optics packages, and electronics.

Magnetic shielding is required to attenuate the magnetic field generated by the ion pump magnetics which are near 1 Tesla in magnitude at their surface. In the CASS system, there is relative proximity between the pump and three-dimensional magneto-optical trap (3D MOT). In normal benchtop configurations, this distance is at least 6 inches. In the CASS design this distance is about 1 inch resulting in more than a factor of 200 increase in magnetic field magnitude. One design incorporates a single layer of high field saturation, but lower permeability material. This design suffers from excessive magnetic field leakage that distorts the MOT. With respect to the commercial applications of the pump shield assembly, it serves as a critical subcomponent within the larger CASS system. The CASS system serves as a basis for QPNT sensors for inertial navigation.

Herein, a "quantum cell" is a structure that: contains and isolates quantum particles from an ambient. Herein, quantum particles are molecular entities (e.g., charged and neutral atoms and molecules) the quantum states of which are to be controlled and/or monitored. A "molecular entity" is any constitutionally or isotopically distinct atom, molecule, ion, ion pair, radical, radical ion, complex, conformer, etc., identifiable as a separately distinguishable entity. Herein, "electromagnetic radiation" (EMR) spans wavelengths from 1 picometer (pm) to 100 kilometers (km). The EMR wavelengths of most interest herein include radio frequency wavelengths, and near ultraviolet, visible, and near infrared light. Herein, "monolithic" means formed from a single piece of material, e.g., a silicon wafer or a metal or glass sheet.

Herein, "mask" refers to a photolithograph or other mask that is an opaque plate with apertures or transparent areas that allow light to shine through in a pre-defined pattern. Such masks are commonly used in photolithography processes, but are also used in many other applications by a wide range of industries and technologies, including quantum cell manufacture. In some cases, one mask is placed over another mask to ensure the flatness or conformity of the latter mask. In such case, the mask that defines the pattern is the "fine" or "precision" mask, while the mask that forces the fine mask into conformity is referred to as the "mother mask".

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the accompanying claims.

What is claimed is:

1. A quantum cell manufacturing process comprising:
    forming a multi-finger jig, the forming of the multi-finger jig including forming slits to define and separate fingers of the multi-finger jig;
    during manufacture of the quantum cell, using the multi-finger jig to apply force to an object to be bonded; and
    before or after using the multi-finger jig, introducing quantum particles into the quantum cell.

2. The quantum cell manufacturing process of claim 1 further comprising modifying or determining quantum states of the quantum particles using electro-magnetic radiation (EMR) transmitted in or out of the quantum cell.

3. The quantum cell manufacturing process of claim 1 wherein the quantum particles are introduced before the multi-finger jig is applied.

4. The quantum cell manufacturing process of claim 1 wherein the quantum particles are introduced after the multi-finger jig is applied.

5. The quantum cell manufacturing process of claim 1 wherein the multi-finger jig is used to apply force to facilitate bonding of a cover or component to a sidewall structure.

6. The quantum cell manufacturing process of claim 1 wherein the multi-finger jig is used to apply force to a first mask used to maintain flatness of a second mask during a photolithographic procedure.

7. The quantum cell manufacturing process of claim 1 wherein the slits are radial.

8. The quantum cell manufacturing process of claim 1 wherein the slits are other than radial.

9. The quantum cell manufacturing process of claim 8 wherein the slits are concentric, angled, or curved.

10. The quantum cell manufacturing process of claim 1 wherein the multi-finger jig is an array jig including plural individual multi-finger jigs.

11. The quantum cell manufacturing process of claim 1 wherein the quantum particles include alkali or alkaline earth metal atoms.

12. The quantum cell manufacturing process of claim 1 wherein the multi-finger jig applies force to a window or component with uniformity about a perimeter to facilitate a rough-vacuum seal between at least two surfaces of the quantum cell to prevent flexure-induced leakage limiting an internal pressure of the quantum cell.

13. A quantum cell manufacturing process comprising:
during manufacture of the quantum cell, using a multi-finger jig to apply force to an object to be bonded, wherein the multi-finger jig is used to apply force to a first mask used to maintain flatness of a second mask during a photolithographic procedure; and
before or after using the multi-finger jig, introducing quantum particles into the quantum cell.

14. The quantum cell manufacturing process of claim 13 further comprising modifying or determining quantum states of the quantum particles using electro-magnetic radiation (EMR) transmitted in or out of the quantum cell.

15. The quantum cell manufacturing process of claim 13 wherein the quantum particles are introduced before the multi-finger jig is applied.

16. The quantum cell manufacturing process of claim 13 wherein the quantum particles are introduced after the multi-finger jig is applied.

17. The quantum cell manufacturing process of claim 13 wherein the multi-finger jig is used to apply force to facilitate bonding of a cover or component to a sidewall structure.

18. The quantum cell manufacturing process of claim 13 wherein the multi-finger jig is an array jig including plural individual multi-finger jigs.

19. The quantum cell manufacturing process of claim 13 wherein the quantum particles include alkali or alkaline earth metal atoms.

20. The quantum cell manufacturing process of claim 13 wherein the multi-finger jig applies force to a window or component with uniformity about a perimeter to facilitate a rough-vacuum seal between at least two surfaces of the quantum cell to prevent flexure-induced leakage limiting an internal pressure of the quantum cell.

\* \* \* \* \*